United States Patent
Acharjee et al.

(10) Patent No.: US 11,894,872 B2
(45) Date of Patent: Feb. 6, 2024

(54) ROUTE SELECTION IN OPTICAL NETWORKS BASED ON MACHINE LEARNING

(71) Applicant: Cisco Technology, Inc., San Jose, CA (US)

(72) Inventors: Prasenjeet Acharjee, Bangalore (IN); Sai Kishore Bhyri, Bangalore (IN); Lavan Kumar Peechara, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 158 days.

(21) Appl. No.: 17/527,598

(22) Filed: Nov. 16, 2021

(65) Prior Publication Data
US 2023/0155677 A1    May 18, 2023

(51) Int. Cl.
*H04B 10/079* (2013.01)
*G06N 20/00* (2019.01)
*H04B 10/25* (2013.01)
*G06N 7/01* (2023.01)

(52) U.S. Cl.
CPC .......... *H04B 10/0795* (2013.01); *G06N 7/01* (2023.01); *G06N 20/00* (2019.01); *H04B 10/25* (2013.01)

(58) Field of Classification Search
None
See application file for complete search history.

(56) References Cited

U.S. PATENT DOCUMENTS

| 9,774,522 | B2* | 9/2017 | Vasseur | H04L 41/16 |
| 10,727,973 | B1 | 7/2020 | Kumar et al. | |
| 11,356,174 | B1* | 6/2022 | Golaghazadeh | H04B 10/27 |
| 2017/0310395 | A1 | 10/2017 | Mehrvar et al. | |
| 2018/0220210 | A1* | 8/2018 | Paraschis | H04Q 11/0062 |
| 2019/0261071 | A1 | 8/2019 | Rafique et al. | |
| 2020/0379839 | A1 | 12/2020 | Savalle et al. | |
| 2021/0351841 | A1* | 11/2021 | Shiner | H04J 14/0271 |

FOREIGN PATENT DOCUMENTS

CN    111935008 A    11/2020

OTHER PUBLICATIONS

Ankur Ankan, "Supported Data Types—pgmpy 0.1.15 documentation," https://pgmpy.org/, Sep. 2021, 3 pages.

(Continued)

*Primary Examiner* — Nathan M Cors
(74) *Attorney, Agent, or Firm* — Edell, Shapiro & Finnan, LLC (57) ABSTRACT

A network node in an optical network dynamically generates a routing table based on attributes of the optical network. The network node obtains attributes characterizing the optical network, which includes multiple network nodes connected by optical links. The network node calculates cost values for sending data from the network node to one or more next hop nodes that are connected to the network node. Each particular cost value is associated with a probability of success of sending the data to a particular next hop node based on a particular permutation of the attributes characterizing the optical network. The network node generates a routing table correlating the permutations of the attributes with each next hop node based on the cost values.

20 Claims, 7 Drawing Sheets

(56) References Cited

OTHER PUBLICATIONS

Haeri, et al., "A Reinforcement Learning-Based Algorithm for Deflection Routing in Optical Burst-Switched Networks," 2013 IEEE 14th International Conference on Information Reuse & Integration (IRI), Aug. 2013, 8 pages.

Natalino, et al., "Machine-Learning-Based Routing of QoS-Constrained Connectivity Services in Optical Transport Networks," https://www.researchgate.net/publication/325757148, Jul. 2018, 3 pages.

Belbekkouche, et al., "A Reinforcement Learning-based Deflection Routing Scheme for Buffer-less OBS Networks," IEEE Globecom 2008-2008 IEEE Global Telecommunications Conference, Conference Paper, retrieved from https://www.researchgate.net/publication/224356357, Jan. 2009, 7 pages.

Zhong, et al., "Routing without Routing Algorithms: an AI-Based Routing Paradigm for Multi-Domain Optical Networks," IEEE, 2019 Optical Fiber Communications Conference and Exhibition (OFC), Mar. 2019, 3 pages.

Guo, et al., "Learning to Route with Sparse Trajectory Sets," 2018 IEEE 34th International Conference on Data Engineering (ICDE), Oct. 2018, 12 pages.

Gauger, "Novel Network Architecture for Optical Burst Transport," Universität Stuttgart Institut für Kommunikationsnetze und Rechnersysteme, Communication Networks and Computer Engineering, Report No. 92, Nov. 2006, 194 pages.

Pavon-Marino, et al., "Net2Plan: An open-source network planning tool for bridging the gap between academia and industry," IEEE Network (vol. 29, Issue: 5, Sep.-Oct. 2015), 17 pages.

Cisco, "Enhanced Interior Gateway Routing Protocol," https://www.cisco.com/c/en/us/support/docs/ip/enhanced-interior-gateway-routing-protocol-eigrp/16406-eigrp-toc.html, Sep. 2020, 49 pages.

Sun, et al., "Calculation and optimization of OSNR based on long-distance OTN network," Atlantis Press, 4th International Conference on Machinery, Materials and Information Technology Applications (ICMMITA 2016), Advances in Computer Science Research, vol. 71, Jan. 2017, 4 pages.

\* cited by examiner

ROUTE SELECTION IN OPTICAL NETWORKS BASED ON MACHINE LEARNING

TECHNICAL FIELD

The present disclosure relates to optical networking.

BACKGROUND

Starting in March 2020, internet traffic patterns shifted and volumes surged as students around the world learned from home, adults worked from home, and everybody did at least something from home. To its enormous credit, the internet bent but, for the most part, did not break as network operators scrambled to deal with the swell in traffic. Global internet bandwidth rose last year by 35%, a substantial increase over the previous year's "modest" 26%.

Backbone/optical networks play a very important role in supporting the required bandwidth. Optical networks over the last few years have evolved with the emergence of Flex spectrum Reconfigurable Optical Add/Drop Multiplexers (ROADMs), high bit rate transponders, colorless-contentionless-omnidirectional add/drop architectures, and an intelligent optical control plane in order to meet the dynamic traffic scenario.

DESCRIPTION OF EXAMPLE EMBODIMENTS

Overview

A computer-implemented method is provided for dynamically generate a routing table based on attributes of an optical network. The method includes obtaining a plurality of attributes characterizing an optical network comprising a plurality of network nodes connected by a plurality of optical links. The method also includes calculating, at a first network node among the plurality of network nodes, a plurality of cost values for sending data from the first network node to one or more next hop network nodes that are connected to the first network node. A particular cost value among the plurality of cost values is associated with a probability of success of sending the data to a particular next hop network node among the one or more next hop network nodes based on a particular permutation of the plurality of attributes characterizing the optical network. The method further includes generating at the first network node, a routing table correlating the plurality of permutations of the attributes with each next hop network node based on the plurality of cost values.

Example Embodiments

Route planning is one of the fundamental tasks in optical networks. As the scale and the complexity of optical networks increases, the conventional Shortest Path First (SPF) routing algorithm may result in low network resource utilization and a high blocking ratio. Heuristic-based route planning suffers high computational complexity when facing a large scale topology.

Current optical design and planning tools select the route of a demand based on shortest distance found using Dijkstra's algorithm. Many theoretical analyses show that routing and resource allocation belongs to the Nondeterministic Polynomial Complete (NP-C) problem in Wavelength Division Multiplexing (WDM) optical networks, Elastic Optical Networks (EONs), or Space Division Multiplexing (SDM) optical networks. Currently, there does not exist a polynomial-time algorithm for routing and resource allocation.

In recent years, Machine Learning (ML) has attracted the attention of both researchers and practitioners to address several issues in field of optical networking. This trend has been mainly driven by the huge amount of available data (e.g., signal quality indicators, network alarms, etc.) and to the large number of optimization parameters which feature current optical networks (e.g., modulation format, lightpath routes, transport wavelength, etc.).

Routing of demands in an optical network plays an important role in achieving a stable network. Route choice simply based on shortest distance does not necessarily determine the best performance in terms of stability of the circuit and optical signal-to-noise ratio (OSNR), which includes signal degradation due to linear effects (e.g., attenuation of fiber, chromatic dispersion, polarization mode dispersion, filtering, amplifier noise contribution, etc.) and non-linear effects (e.g., self-phase modulation, cross phase modulation, four wave mixing, etc.) encountered by signal during its propagation through fiber. The OSNR for a particular optical link is defined as the ratio of service signal power to noise power within a specified bandwidth. Incorporating real network data and behavior helps in building a more robust optical network.

The techniques presented herein solve this problem by considering dynamic attributes of the optical network (e.g., real fiber cut information and optical performance (in terms of OSNR) of the considered route) that describe a recent state of the optical network, along with static attributes (e.g., span length) that describe a relatively stable state of the optical network during the route determination process. Each network node may obtain fiber cut information and optical performance (in terms of OSNR) through management software, and may be provided in future through an optical network controller. Fiber cut information for every fiber spans in the network may be obtained by the management software by reading Loss Of Signal (LOS) alarms from optical nodes (e.g., optical cards in a network node) connected to the fiber span. By reading the LOS alarms from all the optical cards facing the fiber spans over a specified amount of time (which may be user specified), the management software may build a fiber cut information table for all the fiber spans. The management software may also fetch OSNR values for every deployed circuit over a specified amount of time (which may be specified by the user), and build an OSNR variation table for every circuit from this fetched data. This variation/deviation for OSNR calculated for every circuit reflects the quality of the path traversed by the circuit and the management software may build a route quality table for every fiber span using this data. Now, every fiber span in the network has fiber cut and optical quality metric information along with distance information. Using fiber cut information, optical performance, and distance during the routing process helps in building a more stable, and better performing optical network.

Figure 1A:
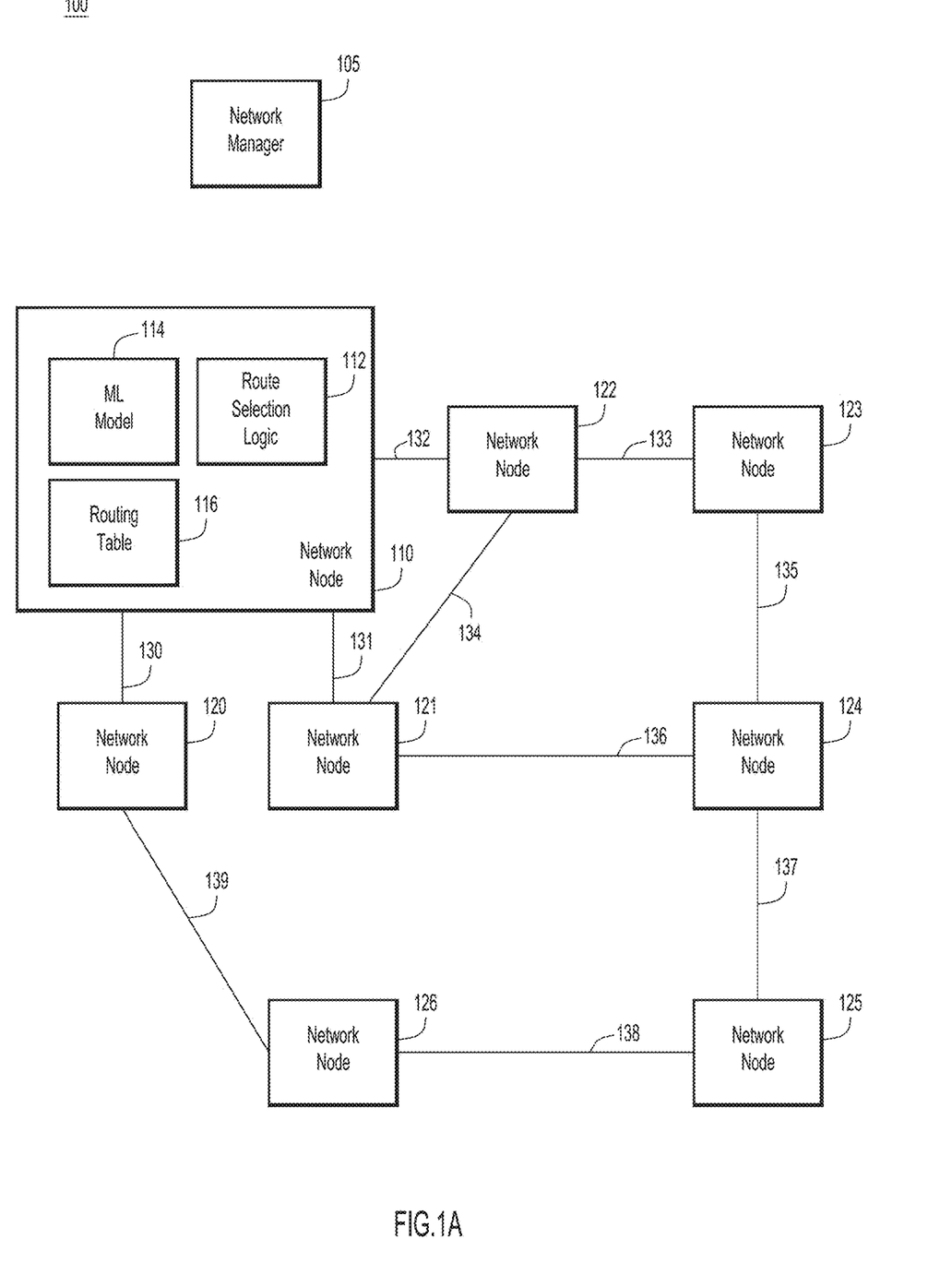
FIG. 1A is simplified block diagram of an optical network configured to select next hop nodes based on a Probabilistic Graphical Routing Model (PGRM), according to an example embodiment.

Referring now to FIG. 1A, a simplified block diagram illustrates an optical network 100 that is managed by a network manager 105. A network node 110 of the optical network 100 illustrates an example of a configuration of the network nodes in the optical network 100. The network node 110 includes route selection logic 112 configured to enable the network node 110 to select a route through the optical network 100 to send data. The network node 110 also includes a ML model 114 to assist in determining the optimal route for data based on a collection of static attributes and dynamic attributes of the optical network 100. The network node 110 further includes a routing table 116 configured to store routes through the optical network 100 as described herein.

The optical network 100 also includes other network nodes 120-126 and optical links 130-138. In the optical network 100 depicted in FIG. 1A, network node 110 is connected to network node 120, network node 121 and network node 122 through optical link 130, optical link 131, and optical link 132, respectively. Network node 122 is further connected to network node 123 and network node 121 though optical link 133 and optical link 134, respectively. Network node 123 is also connected to network node 124 through optical link 135. Network node 124 is further connected to network node 121 and network node 125 through optical link 136 and optical link 137, respectively. Network node 125 is also connected to network node 126 through optical link 138. Network node 126 is further connected to network node 120 through optical link 139.

In one example, the network nodes 110 and 120-126 may be switches or routers with one or more optical cards. Additionally, the network nodes 120-126 may also include similar components to the network node 110 (i.e., similar to route selection logic 112, ML model 114, and routing table 116) configured for operation at each of the network nodes 120-126. In other words, the ML model in the network node 120 may include a routing table for directing data to the network nodes 110 and 126 that are neighboring nodes of the network node 120, while the routing table 116 in the network node 110 includes entries for routing data to the network nodes 120, 121, and 122 that are neighboring nodes of the network node 110. Similarly, the ML model for each network node 120-126 may include similar input variables (e.g., fiber cut information, OSNR, etc.) as the ML model 114 in the network node 110, but with different decision nodes and different weights leading to the decision nodes. The optical links 130-139 may include one or more fiber optic cables for bidirectional traffic over single mode fibers or multi-mode fibers between neighboring network nodes.

In another example, the route selection logic 112 operates to generate and update the ML model 114 and the routing table 116 based on attributes of the optical network 100. Some of the attributes may be relatively static and unchanging through the lifespan of the optical network 100, such as the span length of optical links 130-139 or the geographical location of network node 110 or network nodes 120-126. Other attributes of the optical network 100 may be relatively dynamic and change in response to real-world conditions of the optical network, such as accidental cuts of the fiber in optical links 130-139 or optical performance of optical fibers (e.g., based on temperature fluctuations).

Figure 1B:
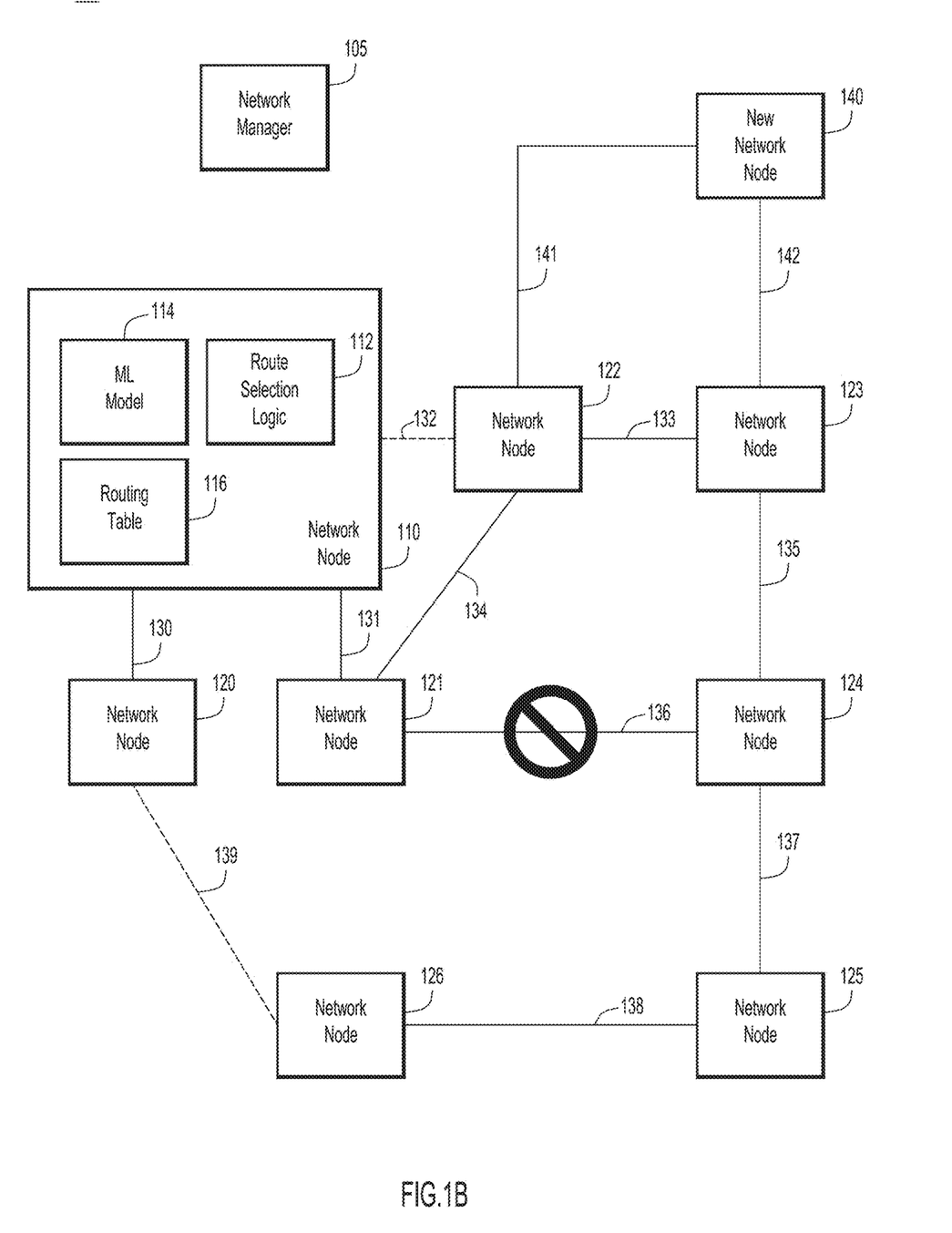
FIG. 1B is a simplified block diagram of an optical network with dynamic attributes that affect the routing table, according to an example embodiment.

Referring now to FIG. 1B, a simplified block diagram illustrates the optical network 100 under dynamic conditions that may affect routing decisions for each network node. The optical network shown in FIG. 1B includes a fiber cut event in optical link 136 that severs communication between network node 121 and network node 124. Additionally, the optical performance (e.g., OSNR) of optical links 132 and 139 may be relatively poor (as depicted by dashed lines), while still allowing some data to flow through the optical links 132 and 139. Additionally, a new network node 140 is added to the optical network 100. The new network node 140 is connected to the network nodes 122 and 123 by optical links 141 and 142, respectively.

In one example, each of these dynamic attributes of the optical network 100 may be incorporated into the ML model 114 that determines the probability of success for the network node 110 to send data via each of the neighboring network nodes 120, 121, and 122. For instance, the ML model 114 may determine that data sent to network node 125 has the highest probability of reaching the network node 125 if the network node 110 sends the data to the next hop network node 122. In this instance, the ML model 114 may determine that sending the data to the next hop network node 120 is less likely to succeed due to the low OSNR in the optical link 139.

Additionally, the ML model may determine that sending the data to the next hop network node 121 is less likely to succeed due to the fiber cut in the optical link 136. The ML model 114 may determine that sending the data to the next hop network node 122 is the most likely to succeed despite the lower OSNR of optical link 132. The routing table 116 may store a relative cost associated with each next hop network element based on the particular permutation of attributes (e.g., fiber cut information, OSNR information, span length information, data destination node, etc.) characterizing the optical network 100 for a particular time frame.

In another example, the network node 110 may detect the addition of the new network node 140 to the topology of the optical network 100 through an update of the attributes of the optical network. For instance, a new destination identifier associated with the new network node 140 signals to the network node 110 that the new network node 140 has joined the optical network 100 and the ML model 114 is automatically updated to incorporate routes that my pass through the new network node 140.

Figure 2:
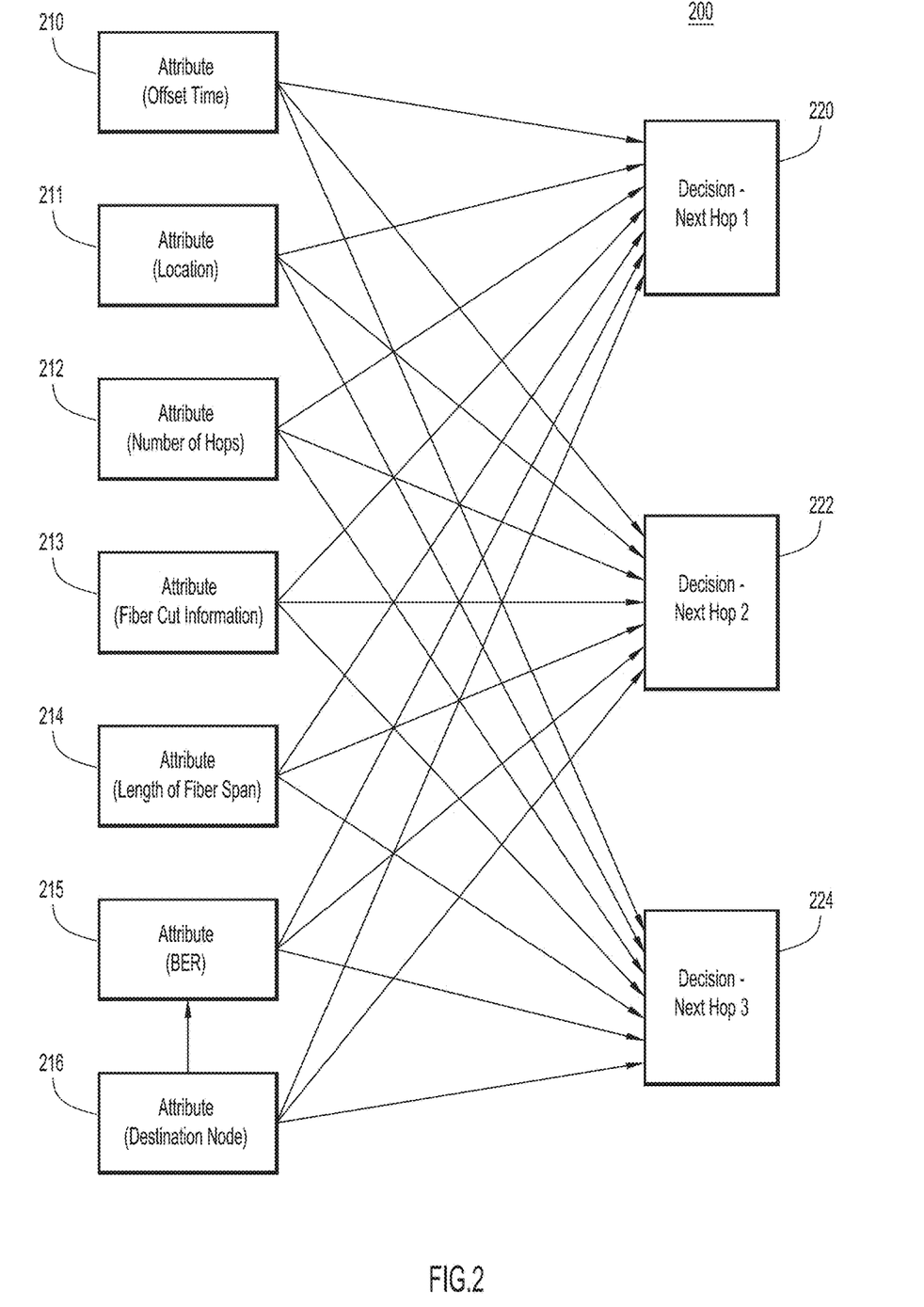
FIG. 2 a diagram depicting a Bayesian network composed of attributes and decision nodes for applying machine-learning techniques to select routing paths in an optical network, according to an example embodiment.

Referring now to FIG. 2, a representation of an ML model 200 (e.g., ML model 114 shown in FIG. 1A and FIG. 1B) for an optical network (e.g., optical network 100) is shown. The ML model 200 includes known attributes of the optical network, which may be independent or conditional on other attributes, and decision nodes. The example of ML model 200 shown in FIG. 2 includes attribute 210 (e.g., offset time between a burst header packet and the burst payload), attribute 211 (e.g., geographical location of the network nodes), attribute 212 (e.g., number of hops between network nodes), attribute 213 (e.g., fiber cut information), attribute 214 (e.g., the length of each fiber span in the optical links of the optical network), attribute 215 (e.g., Bit Error Rate (BER)), and attribute 216 (destination node identifier). In the representation of ML model 200, the attributes 210-214 are independent of each other, but the attribute 215 is conditional on the attribute 216, as shown by the arrow from attribute 216 to attribute 215.

The ML model 200 applies weights to each of the attributes 210-216 and calculates values for each of the decision nodes 220, 222, and 224, which represent a decision to send data to a corresponding next hop network node. In other words, the ML model 200 is trained to determine weight values that will determine the probability of success in sending data to each next hop network node. Based on the probability of success for each next hop network node, the network node running the ML model 200 populates a routing table that correlates a set of attribute values (i.e., values of attributes 210-216) with a cost associated with the probability of success for sending data to each next hop network node based on that set of attribute values. The ML model 200 may recalculate the cost for each permutation of attribute values to send data to each next hop network node periodically and update the routing table with the recalculated costs.

In one example, the ML model 200 is a Probabilistic Graphical Routing Model (PGRM) is used to optimally calculate and allocate routes. A probabilistic graphical model specifies a family of probability distributions which can be represented in terms of a graph. A Bayesian network is an example of a probabilistic graphical model and a directed acyclic graph. Nodes represent variables and links represent dependencies.

A Bayesian network is composed of known information (e.g. attributes 210-216) and decision nodes (e.g., nodes 220, 222, and 224) as shown in FIG. 2. A Bayesian network is a model to represent the knowledge as well as a conditional probability calculator. It is also a learning model that can be used to learn the parameters (conditional distributions) or the structure of the Bayesian network.

Bayesian networks are directed acyclic graphs (DAGs) whose nodes represent variables in the Bayesian sense: they may be observable quantities, latent variables, unknown parameters or hypotheses. Edges represent conditional dependencies; nodes that are not connected (e.g., attribute 210 and attribute 211) represent variables that are conditionally independent of each other. Each attribute 210-216 can be thought of as a parameter to the system. The attributes 210-214 that are not connected are assumed to be conditionally independent of each other. However, attribute 216 (e.g., destination node) and attribute 215 (e.g., BER) are connected in this Bayesian model of ML model 200. For instance, the BER is for a specific service (e.g., from source to destination), and the BER for the service to that destination depends on the destination.

In another example, each network node in the optical network shown in FIG. 1A and FIG. 1B includes a PGRM/Bayesian network (e.g., an instance of ML model 200). The main functionality of each ML model is the selection of the next hop for the forwarding process.

Figure 3:
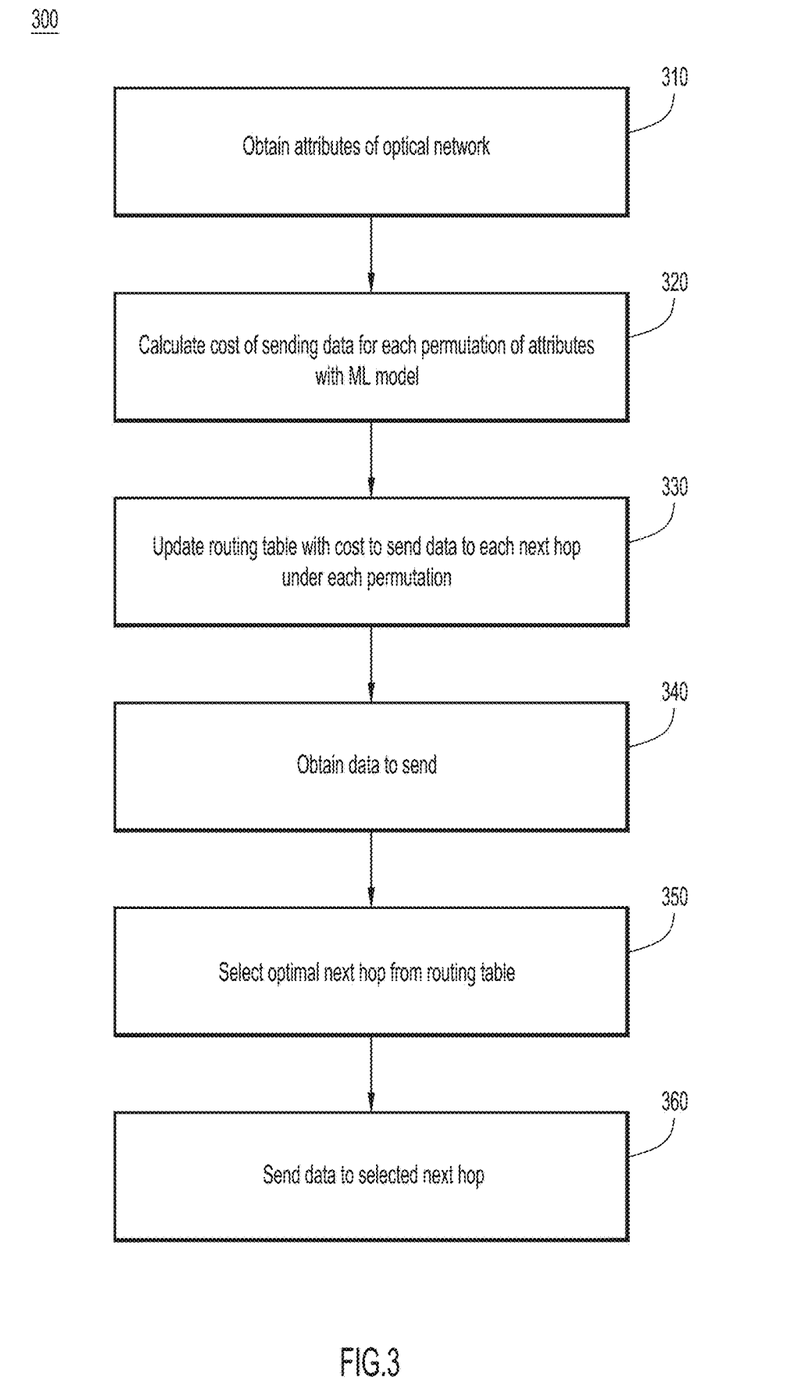
FIG. 3 is a flowchart illustrating operations performed by a network node to send data through an optical network, according to an example, embodiment.

Referring now to FIG. 3, a flowchart illustrates an example process 300 performed by a network node (e.g., network node 110) to leverage attributes of the optical network (e.g., optical network 100) in selecting an optimal next hop for data sent from the network node. At 310, the network node obtains attributes of the optical network. In one example, the attributes may include static attributes (e.g., fiber span length, geographical location data), which are unlikely to change often, and dynamic attributes (e.g., fiber cut information, OSNR, destination node), which may change significantly between routing decisions.

At 320, the network node calculates the cost of sending data for each permutation of attributes with an ML model. In one example, the ML model may be a PGRM/Bayesian model with decision nodes that output a probability of success in sending data through each next hop network node based on permutations of the attributes. The network node updates a routing table at 330 to reflect the calculated cost of sending data to each next hop network node for each permutation of attributes.

At 340, the network node obtains data to send through the optical network. In one example, a source endpoint attached to the network node may provide data to send to a destination endpoint attached to a different network node. Based on the routing table, the network node selects a next hop network node for the data at 350. In one example, the network node selects a next hop network node for the data based on the lowest cost, which is associated with the highest probability of success in the data reaching the destination endpoint. At 360, the network node sends the data to the selected next hop network node. If the next hop network node is not the final destination within the optical network for the data, then the next hop network node may perform some or all of the process 300 to forward the data to a subsequent next hop network node.

In one example, to maintain a fast forwarding process, the routing table may be updated (i.e., steps 310-330 of the process 300) periodically. As a specific example, the ML model for a network node may include four attributes and one decision node for each possible next hop network node. A lookup to the routing table is done according to the attributes in order to successively select the best next hop in terms of probability of success to reach the destination. The ML model may include the following attributes:

1. OSNR (O): Optical signal-to-noise ratio (OSNR) is used to quantify the degree of optical noise interference on optical signals. It is the ratio of service signal power to noise power within a valid bandwidth.

2. Fiber cut information (FC): Persistent fiber cut has been a challenging issue to deal with by the telecom companies in the industry. Cut optical fibers have a tremendous negative effect on quality of services delivery and customer experience.

3. Length of the span (LS): Longer length of a fiber span typically provides lower quality of service and longer delays.

4. Destination (D): Possible states of this attributes are network node identifiers.

The ML model also includes one decision node per possible next hop network node. Referring to FIG. 1A and FIG. 1B, the ML model 114 would include three decision nodes—one decision node for each neighboring network node 120, 121, and 122. Each decision node has two possible states: Success (noted ⊕) and Failure (noted ⊖).

Let k be a node identifier, $OC_k$ expresses the Bayesian decision node of the next hop k, the joint probability function of the proposed model is given by:

$$P(O, FC, LS, D, OC1, \ldots, OCN) = \left(\prod_{i=1}^{N} P(OCi \mid O, FC, LS, D)\right) * P(O) * P(FC) * P(LS) * P(D)$$

The maximum a posteriori of $OC_k$ is defined by:

$$MAPOCk = \max_{\varphi} P(\varphi \mid o, b, nb, d)$$

where $\varphi \in \{\oplus, \ominus\}$ which is a possible value of node $OC_k$ and where o, b, nb, d are possible values of the attributes in the ML model, and represent OSNR, fiber cut, length of span, and destination, respectively.

The "probability of success to reach the destination" is the criterion according used by the process. The probability of success is associate with a "cost," which is based on the permutations of the attributes. As the cost will be higher for volatile spans, the probability of success will be lower for paths having those spans. To reach a destination, a route which has the least cost (based on the attributes/parameters considered) and high probability of success will be chosen once it is established that there is a path between source to destination. Latency (of the fiber and of a card) can be considered while choosing the route in optical domain. However, latency is not typically a major issue in the optical domain (in contrast to the routing domain) though latency can certainly be considered in some implementations.

The techniques presented herein use a different routing table than to the typical approaches, such as the shortest path, in order to consider ML model (e.g., PGRM/Bayesian network). In most routing approaches, metrics used in the routing table are <Destination, Next hop, Cost>. However, the routing tables described herein use <Attributes, Next hop, Cost> where permutations of the attributes add granularity in order to route the traffic more effectively. The routing table is a fast routing table defined as:

TABLE 1

ML model generated Routing Table

| Attributes | Next Hop | Cost |
|---|---|---|
| $\{O_1, FC_1, LS_1, D_1\}$ | $OC^1{}_1$ | $1\text{-}SP(OC^1{}_1, O_1, FC_1, LS_1, D_1)$ |
| ... | ... | ... |
|  | $OC^1{}_\beta$ | $1\text{-}SP(OC^1{}_\beta, O_1, FC_1, LS_1, D_1)$ |
| ... | ... | ... |
| $\{O_i, FC_i, LS_i, D_i\}$ | $OC^i{}_1$ | $1\text{-}SP(OC^i{}_1, O_i, FC_i, LS_i, D_i)$ |
|  | $OC^i{}_\beta$ | $1\text{-}SP(OC^i{}_\beta, O_i, FC_i, LS_i, D_i)$ |
| ... | ... | ... |
| $\{O_\triangleright, FC_\beta, LS_\mu, D_\emptyset\}$ | $OC^{EP}{}_1$ | $1\text{-}SP(OC^{EP}{}_1, O_\triangleright, FC_\beta, LS_\mu, D_\emptyset)$ |
|  | $OC^{EP}{}_\beta$ | $1\text{-}SP(OC^{EP}{}_\beta, O_\triangleright, FC_\beta, LS_\mu, D_\emptyset)$ | where $\beta$ expresses the number of different next hops depending on the attributes of the i permutation, $\triangleright$, $\beta$, $\mu$, $\emptyset$ are the number of possible states for evidence variables. $OC^j{}_k$ represents the $k^{th}$ next hop of the $i^{th}$ permutation of the attributes O, FC, LS, and D. The column "Attributes" represents all of the permutations of all of the attributes. The number of permutations is defined by $$EP = \triangleright * \beta * \mu * \emptyset$$

Thus, the number of rows in the routing table is defined by:

$$N_{ROWS} = \sum_{1}^{EP} \beta_i$$

The cost is expressed by:

$$\text{Cost}(OC,O,FC,LS,D) = 1 - SP(OC,O,FC,LS,D)$$

In another example, an attribute with a continuous distribution of possible values, such as OSNR ranging from 5 dB to 50 dB, may be separated into discrete ranges to define a particular permutation of that attribute. For instance, the OSNR attribute may be separated into groups, such as below 10 dB, 10-15 dB, 16-20 dB, 21-30 dB, and above 30 dB, to define a discrete number of permutations (e.g., five permutations of OSNR) that can be counted. Attributes with discrete values (e.g., destination node identifiers) would not need to be grouped because the number of possible permutations is already bounded by the number of discrete values.

Evaluation and Results

In another example, the pgmpy Python library may be used for the Bayesian network. pgmpy is a Python library for working with Probabilistic Graphical Models. Several graph models and inference algorithms are implemented in pgmpy. pgmpy also allows users to create their own inference algorithm.

The ML model described herein (i.e., a PGRM) is compared to the well-known Shortest Path algorithm for the performance comparison. The shortest path algorithm always selects paths minimizing the number of hops. The PGRM tends to select paths in order to maximize link utilization and to select paths having the least OSNR and fiber cut history between source and destination. An implicit benefit of the PGRM is the capability of a network node, without initial routing information, to learn its neighboring network nodes in order to route and distribute the traffic efficiently. Additionally, each network node can use the PGRM to apply an automatic fault recovery mechanism when faults happen in a topology. The Shortest Path algorithm has initial information about the topology such as next hops, number of hops to reach destinations, or other static attributes. The PGRM requires less than one second to learn how to distribute the traffic at least as effectively as the Shortest Path.

The PGRM avoids paths which have had recent fiber cuts, and chooses the path having the best OSNR. The area where the PGRM differs from the Shortest Path algorithm is that it chooses the path based on other parameters and not just the span length.

The PGRM gives a slight end-to-end delay (e.g., less than one millisecond) compared to the shortest path algorithm, which can be explained by the fact that the PGRM does not necessarily select the shortest path. The PGRM can select a next hop network node that requires more hops to reach the destination based on factors such as choosing links which are less utilized, links having low OSNR, and links with the least fiber cuts in the recent past. However, the slight delay does not have an impact on transport protocols such as Transport Control Protocol (TCP). The PGRM provides significant improvement in terms of network utilization (e.g., about 20% higher network utilization). A gain of 20% of network utilization can decrease more than 50% of Burst Loss Ratio.

Figure 4:
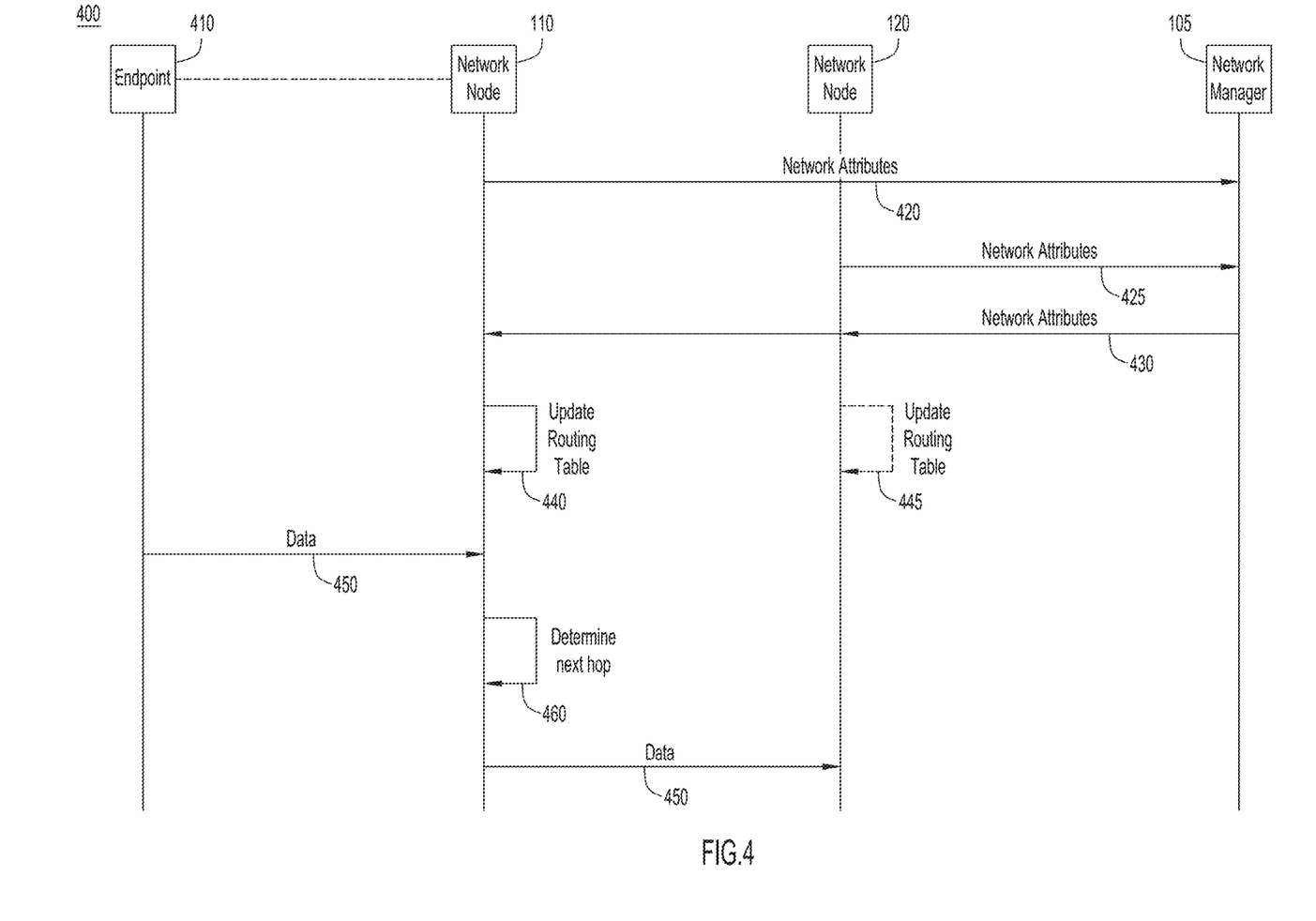
FIG. 4 is a message flow diagram illustrating a network node updating a routing table and selecting a next hop for data, according to an example embodiment.

Referring now to FIG. 4, a message flow diagram 400 illustrates messages passed between elements of an optical network to update routing tables and select a next hop for moving data from a source endpoint 410 attached to a network node 110 to the next hop network node in a route toward a destination. The network manager 105 gather network attributes 420 from the network node 110 and network attributes 425 from the network node 120. In one example, the network attributes 420 and 425 may include measurements of OSNR, fiber cut information (e.g., loss of signal data), and/or other dynamic attributes. If any static attributes of the optical network have changed, then the network attributes 420 and/or network attributes 425 may reflect the change in the static attributes as well.

The network manager 105 distributes network attributes 430 characterizing the optical network to all of the network nodes in the optical network, including the network node 110 and the network node 120. In one example, the network manager may be embodied as software on each network node rather than a separate physical entity, and the network attributes 420, 425, and 430 are passed directly between the network nodes. In another example, the network manager 105 may process the network attributes 420 and 425 to generate a more useful form of network attribute. For instance, the network manager 105 may collect loss of signal information in the network attributes collected from each network node (i.e., in network attributes 420 and 425), and process the loss of signal information to determine fiber cut information. Once the network node 110 receives the network attributes 430, the network node 110 updates a local routing table at 440 as described with respect to FIG. 3. Additionally, the network node 120 may also update a local routing table stored on the network node 120 at 445.

When the source endpoint 410 sends data 450 to the network node 110 to which the endpoint 410 is connected, the network node 110 selects a next hop network element from the routing table at 460. In one example, the network node selects the next hop network node that is associated with the lowest cost (i.e., the highest probability of success) for the specific permutation of network attributes received in the network attributes 430. For instance, the network attributes 430 may include four attributes that characterize the state of the optical network, such as that the OSNR for certain links are good or bad, that other links have a history of frequent fiber cuts, and the span length of the optical links. Additionally, the network node 110 may determine other attributes (e.g., the destination of the data 450) to determine the specific permutation of network attributes used to select the next hop network node. Once the network node 110 has selected the next hop network node (e.g., network node 120) that is correlated in the routing table with the lowest cost for that specific permutation of network attributes, the network node 110 forwards the data 450 to the network node 120 as the next hop network node.

If the destination endpoint is connected to the network node 120, then the network node 120 would send the data 450 to the destination endpoint. Otherwise, the network node 120 would continue to forward the data 450 by selecting a subsequent next hop network node based on the routing table stored on the network node 120 (i.e., the routing table updated at 445) and forwarding the data 450 to the subsequent next hop network element.

Figure 5:
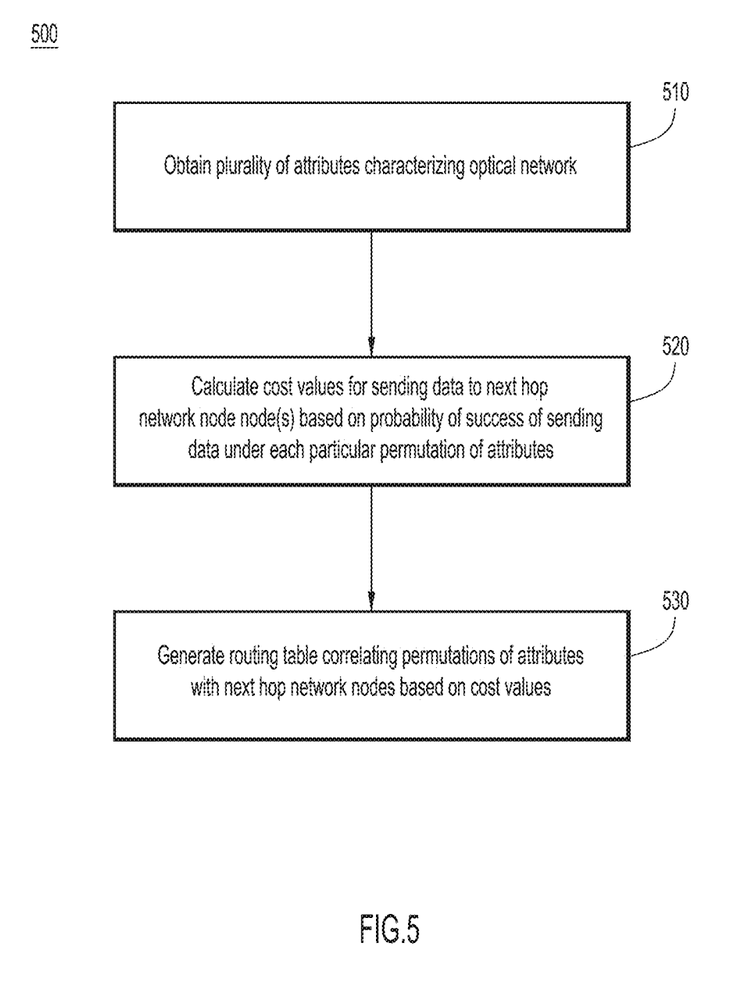
FIG. 5 is a flowchart illustrating operations performed by each network node in an optical network to generate a routing table based on attributes of the network, according to an example embodiment.

Referring now to FIG. 5, a flowchart illustrates operations performed by a first network node (e.g., network node 110) in an example process 500 for generating a routing table according to the techniques described herein. In one example, each network node in the optical network performs the process 500 to generate a routing table specific to that network node. At 510, the network node obtains a plurality of attributes characterizing an optical network comprising a plurality of network nodes. In one example, a plurality of optical links connect the plurality of network nodes. In another example, the plurality of attributes may include static attributes (e.g., span length, geographic locations, etc.) and/or dynamic attributes (e.g., OSNR, fiber cut information, etc.).

At 520, a first network node among the plurality of network nodes calculates a plurality of cost values for sending data from the first network node to one or more next hop network nodes that are connected to the first network node. Each particular cost value is associated with a probability of success in sending the data to a particular next hop network node based on a particular permutation of the plurality of attributes characterizing the optical network. In one example, the first network node calculates the plurality of cost values using a ML model (e.g., a PGRM or Bayesian model) that is executing on the first network node. In another example, each network node in the optical network may include an ML model that is specific to that particular network node and is used to calculate the cost values for next hop network nodes of that particular network node.

At 530, the first network node generates a routing table that correlates the plurality of permutations of the attributes with each next hop network node based on the plurality of cost values. In one example, the routing table includes a number of rows equal to the number of possible permutations of the attributes multiplied by the number of next hop network nodes. In another example, the first network node may sort the routing table according to the cost values to determine an optimal route for each particular permutation of attributes that is correlated with the lowest cost value for that particular permutation of attributes.

Figure 6:
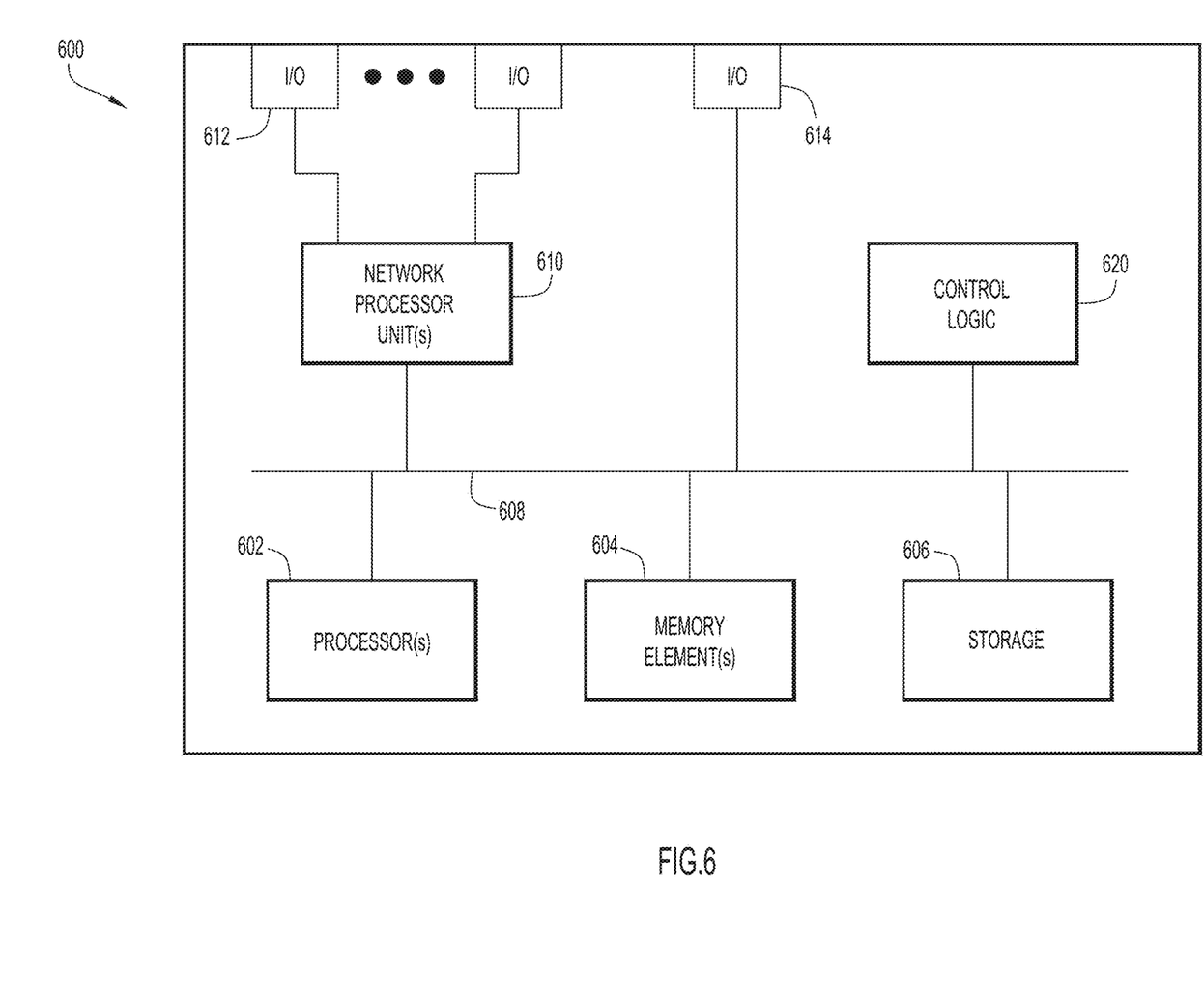
FIG. 6 is a block diagram of a computing device that may be deployed at each network node in an optical network and configured to perform the techniques presented herein, according to an example embodiment.

Referring to FIG. 6, FIG. 6 illustrates a hardware block diagram of a computing device 600 that may perform functions associated with operations discussed herein in connection with the techniques depicted in FIGS. 1A, 1B, and 2-5. In various embodiments, a computing device, such as computing device 600 or any combination of computing devices 600, may be configured as any entity/entities as discussed for the techniques depicted in connection with FIGS. 1A, 1B, and 2-5 in order to perform operations of the various techniques discussed herein.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable.

For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques presented herein provide for ML-based routing that improve on shortest path based algorithms by proposing a routing scheme based on traffic history, and minimizing network congestion in a dynamic way. Additionally, the techniques presented herein improve network utilization dynamically and in an unsupervised way. Further, the techniques presented herein create a physically stable network by utilizing novel parameters, such as fiber cut history, for path computation. The PGRM-based techniques described herein enable a network node to an unknown topology of an optical network and potentially recover from network faults.

Routing and resource allocation belongs to the Nondeterministic Polynomial Complete (NP-C) problem. As the scale and the complexity of optical networks increase, the conventional Shortest Path First (SPF) routing algorithm may result in low network resource utilization and high blocking probability. The routing mechanism presented herein adapts routing paths according to the network environment (e.g., traffic variations, link or node failure, topology changes).

Routing considering other parameters (e.g., optical performance, reliability, etc.) apart from distance have been studied and published. The techniques presented herein involve feeding these parameters into an ML model that dynamically determines and computes the routing tables based on the evolving nature of the network. There is no need for manual intervention in computing the routing tables. Since this solution is driven by machine learning, the system will continuously evolve without the need for maintenance and human supervision.

The training/re-training happens in a live network and the routing tables are updated dynamically. Moreover, the network nodes learn the network topology in a live network. There is no need for a user to determine and program the network topology beforehand. This also enables network operators to add new nodes in the network and have the ML system detect the addition of a new node and update the routing tables dynamically. This enables fast and easy planning and re-planning of a live deployed optical network in spite of increased scale and the complexity.

In one form, a method is provided for dynamically generate a routing table based on attributes of an optical network. The method includes obtaining a plurality of attributes characterizing an optical network comprising a plurality of network nodes connected by a plurality of optical links. The method also includes calculating, at a first network node among the plurality of network nodes, a plurality of cost values for sending data from the first network node to one or more next hop network nodes that are connected to the first network node. A particular cost value among the plurality of cost values is associated with a probability of success of sending the data to a particular next hop network node among the one or more next hop network nodes based on a particular permutation of the plurality of attributes characterizing the optical network. The method further includes generating at the first network node, a routing table correlating the plurality of permutations of the attributes with each next hop network node based on the plurality of cost values.

In another form, an apparatus comprising a network interface and a processor is provided. The network interface is configured to communicate with one or more computing devices. The processor is coupled to the network interface, and configured to obtain a plurality of attributes characterizing an optical network comprising a plurality of network nodes including the apparatus. The processor is also configured to calculate a plurality of cost values for sending data from the apparatus to one or more next hop network nodes that are connected to the apparatus. A particular cost value among the plurality of cost values is associated with a probability of success of sending the data to a particular next hop network node among the one or more next hop network nodes based on a particular permutation of the plurality of attributes characterizing the optical network. The processor is further configured to generate a routing table correlating the plurality of permutations of the attributes with each next hop network node based on the plurality of cost values.

In still another form, a non-transitory computer readable storage media is provided that is encoded with instructions that, when executed by a processor of first network node of an optical network, cause the processor to obtain a plurality of attributes characterizing the optical network comprising a plurality of network nodes connected by a plurality of optical links. The instructions also cause the processor to calculate a plurality of cost values for sending data from the first network node to one or more next hop network nodes that are connected to the first network node. A particular cost value among the plurality of cost values is associated with a probability of success of sending the data to a particular next hop network node among the one or more next hop network nodes based on a particular permutation of the plurality of attributes characterizing the optical network. The instructions further cause the processor to generate a routing table correlating the plurality of permutations of the attributes with each next hop network node based on the plurality of cost values.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining a plurality of attributes characterizing an optical network, the optical network comprising a plurality of network nodes connected by a plurality of optical links;
    at a first network node among the plurality of network nodes, calculating a plurality of cost values for sending data from the first network node to one or more next hop network nodes that are connected to the first network node, wherein a particular cost value among the plurality of cost values is associated with a probability of success of sending the data to a particular next hop network node among the one or more next hop network nodes based on a particular permutation of the plurality of attributes characterizing the optical network;
    at the first network node, generating a routing table correlating a plurality of permutations of the attributes with each next hop network node based on the plurality of cost values; and
    detecting at least one new network node in the optical network from a new permutation of the attributes characterizing the optical network.

2. The method of claim 1, wherein the plurality of attributes includes at least one dynamic attribute associated with a recent state of the optical network.

3. The method of claim 1, wherein the plurality of attributes include an Optical Signal-to-Noise Ratio (OSNR)

for optical links between the plurality of network nodes, a fiber cut history for the optical links, a span length of the optical links, and destination identifiers for the network nodes in the optical network.

4. The method of claim 1, wherein calculating comprises using a machine-learning model on the first network node to calculate the particular cost value for sending data to the particular next hop network node.

5. The method of claim 4, wherein the machine-learning model is a Bayesian network.

6. The method of claim 4, wherein the machine-learning model calculates the particular cost value to maximize link utilization across the optical network.

7. The method of claim 4, wherein the machine-learning model calculates the particular cost value to select paths to minimize an Optical Signal-to-Noise Ratio (OSNR) and a fiber cut history for the optical links.

8. The method of claim 1, wherein the calculating a respective plurality of cost values and generating a respective routing table is performed at each respective network node of the plurality of network nodes in the optical network.

9. An apparatus comprising:
a network interface configured to communicate with one or more computing device; and
a processor coupled to the network interface, the processor configured to:
  obtain via the network interface, a plurality of attributes characterizing an optical network, the optical network comprising a plurality of network nodes including the apparatus;
  calculate a plurality of cost values for sending data from the apparatus to one or more next hop network nodes that are connected to the apparatus, wherein a particular cost value among the plurality of cost values is associated with a probability of success of sending the data to a particular next hop network node among the one or more next hop network nodes based on a particular permutation of the plurality of attributes characterizing the optical network;
  generate a routing table correlating a plurality of permutations of the attributes with each next hop network node based on the plurality of cost values; and
  detect at least one new network node in the optical network from a new permutation of the attributes characterizing the optical network.

10. The apparatus of claim 9, wherein the plurality of attributes includes at least one dynamic attribute associated with a recent state of the optical network.

11. The apparatus of claim 9, wherein the plurality of attributes include an Optical Signal-to-Noise Ratio (OSNR) for optical links between the plurality of network nodes, a fiber cut history for the optical links, a span length of the optical links, and destination identifiers for the network nodes in the optical network.

12. The apparatus of claim 9, wherein the processor is configured to calculate the plurality of cost values by using a machine-learning model on the apparatus to calculate the particular cost value for sending data to the particular next hop network node.

13. The apparatus of claim 12, wherein the machine-learning model is a Bayesian network.

14. The apparatus of claim 12, wherein the processor is configured to use the machine-learning model to calculate the particular cost value to maximize link utilization across the optical network.

15. One or more non-transitory computer readable storage media encoded with software comprising computer executable instructions and, when the software is executed on a processor of a first network node of an optical network, operable to cause a processor to:
  obtain a plurality of attributes characterizing the optical network, the optical network comprising a plurality of network nodes connected by a plurality of optical links;
  calculate a plurality of cost values for sending data from the first network node to one or more next hop network nodes that are connected to the first network node, wherein a particular cost value among the plurality of cost values is associated with a probability of success of sending the data to a particular next hop network node among the one or more next hop network nodes based on a particular permutation of the plurality of attributes characterizing the optical network;
  generate a routing table correlating a plurality of permutations of the attributes with each next hop network node based on the plurality of cost values; and
  detect at least one new network node in the optical network from a new permutation of the attributes characterizing the optical network.

16. The one or more non-transitory computer readable storage media of claim 15, wherein the software is further operable to cause the processor to calculate the plurality of cost values by using a machine-learning model on the first network node to calculate the particular cost value for sending data to the particular next hop network node.

17. The one or more non-transitory computer readable storage media of claim 16, wherein the machine-learning model is a Bayesian network.

18. The one or more non-transitory computer readable storage media of claim 16, wherein the machine-learning model calculates the particular cost value to maximize link utilization across the optical network.

19. The one or more non-transitory computer readable storage media of claim 15, wherein the plurality of attributes includes at least one dynamic attribute associated with a recent state of the optical network.

20. The one or more non-transitory computer readable storage media of claim 15, wherein the plurality of attributes include an Optical Signal-to-Noise Ratio (OSNR) for optical links between the plurality of network nodes, a fiber cut history for the optical links, a span length of the optical links, and destination identifiers for the network nodes in the optical network.

* * * * *